United States Patent
Nagaike et al.

[11] Patent Number: 5,906,248
[45] Date of Patent: May 25, 1999

[54] SAFETY DEVICE FOR CAB OVER TYPE VEHICLE

[75] Inventors: Naofumi Nagaike; Tatsuaki Hayashida, both of Yokohama, Japan

[73] Assignee: Mitsubishi Jidosha Kogyo Kabushiki Kaisha, Tokyo, Japan

[21] Appl. No.: 08/905,119

[22] Filed: Aug. 1, 1997

[30] Foreign Application Priority Data

Aug. 2, 1996 [JP] Japan .................................. 8-220347

[51] Int. Cl.⁶ .................................................. B62D 33/06
[52] U.S. Cl. ..................................... 180/89.14; 180/89.15
[58] Field of Search ............................. 180/89.14, 89.15

[56] References Cited

U.S. PATENT DOCUMENTS

| | | | |
|---|---|---|---|
| 3,797,883 | 3/1974 | Steiner et al. | 180/89.14 |
| 3,948,341 | 4/1976 | Foster | 180/89.15 |
| 3,958,659 | 5/1976 | Selman | 180/89.15 |
| 4,463,818 | 8/1984 | Sonneborn | 180/89.15 |

FOREIGN PATENT DOCUMENTS 529964A 7/1993 Japan .

*Primary Examiner*—Kenneth R. Rice

[57] ABSTRACT

A device for improving a safety of a crew in a cab over type vehicle by absorbing shock at the time of a collision of the vehicle with a simple structure in which each main sill is provided on the right and left sides under the cab the tips of the main sills are connected together with a cross pipe in the vehicle width direction, and the cab is pivotally supported on the right and left sides of the chassis frame through the cab hinge shaft.

On the other hand, the central portion of a pipe shaped like a substantial U-character, both ends of which are fixed to the right and left sides of the chassis frame respectively, rises above the chassis frame, and a belt or wire is spanned between the cross pipe and the central portion of the pipe.

13 Claims, 3 Drawing Sheets

SAFETY DEVICE FOR CAB OVER TYPE VEHICLE

BACKGROUND OF THE INVENTION

1. Field of the Invention

The present invention relates to a device for securing, in a cab over type vehicle, a crew's safety by absorbing the shock at the time of its collision.

2. Description of Related Art

In a conventional cab over type vehicle, as exemplified in Japanese Utility Model Publication No. 5-29964, it has been structured in such a manner that a guard member is arranged on the back face of the front panel of a cab, and the guard member and the frame are connected by a hydraulic cylinder whereby any deformation of the cab is restrained by the guard member at the time of a collision of the vehicle, and also the shock is absorbed by the hydraulic cylinder to protect the crew. The arrangement of the guard member, however, causes the cab itself to become larger in size, and also increase its weight, and in addition, since the hydraulic cylinder for connecting the guard member and the frame is inclined with respect to the front face of the cab, there is the problem that the shock absorbing operation of the hydraulic cylinder at the time of a collision of the vehicle does not always function smoothly.

SUMMARY OF THE INVENTION

It is an object of the present invention to provide, in a cab over type vehicle, a device for securing the crew's safety by effectively absorbing a shock at the time of a collision of the vehicle with a simple structure.

To this end, a safety device for a cab over type vehicle according to the present invention comprises a lateral pair of reinforcing members provided under the cab, for extending in a longitudinal direction of the vehicle; a cross member, both ends of which are connected to the reinforcing members at their front end portions respectively, for extending in a vehicle width direction; and an energy absorption member, one end of which is located in the vicinity of the cross member, and the other end of which is fixed to a chassis frame, and the cross member and the energy absorption member are connected together with a flexible member.

More specifically, a cross member, both ends of which are connected together to a lateral pair of cab reinforcing members respectively, extending in the vehicle width direction, and one end of the energy absorption member, fixed to the chassis frame, are connected together with a flexible member, and the cab is engaged with the chassis frame through the flexible member and the energy absorption member. Therefore, rear displacement of the cab due to a collision of the vehicle is restrained by the chassis frame, and the shock transmitted from the cab reinforcing members to the energy absorption member through the cross member and the flexible member can be securely absorbed by the deformation of the energy absorption member to lessen the shock received by the cab. Also, the cross member and one end of the energy absorption member are connected together with a flexible member so that the difference in the relative distance caused between the cross member and the energy absorption member, when the cab tilts, can be easily absorbed by the flexible member, and therefore, no obstruction is caused to the tilting operation of the cab.

It is a further object of the invention to provide a safety device, wherein the flexible member is a wire or a belt.

It is a yet further object of the invention to provide a safety device, comprises a stopper for restraining deviation of the flexible member in the vehicle width direction along the cross member and/or the energy absorption member.

It is an even still further object of the invention to provide a safety device, comprises a stopper for restraining deviation of the flexible member in the vehicle width direction along the cross member and/or the energy absorption member.

It is a yet still further object of the invention to provide a safety device, wherein a plurality of flexible members are arranged at intervals in the vehicle width direction.

It is another object of the invention to provide a safety device, wherein a plurality of flexible members are arranged at intervals in the vehicle width direction.

It is still another object of the invention to provide a safety device, wherein a plurality of flexible members are arranged at intervals in the vehicle width direction.

It is even still another object of the invention to provide a safety device, comprises:

a lower cab hinge bracket attached to the chassis frame: and an upper cab hinge bracket attached to the reinforcing member and pivotally connected to the lower cab hinge such that the cab tilts around a pivotal point, wherein the flexible member absorbs changes in a distance between the cross member and the central portion of the energy absorption member when tiling the cab.

It is yet still another object of the invention to provide a safety device, wherein a length of the flexible member is longer than a distance between the cross member and the central portion of the energy absorption member.

DETAILED DESCRIPTION OF PREFERRED EMBODIMENT

Figure 1:
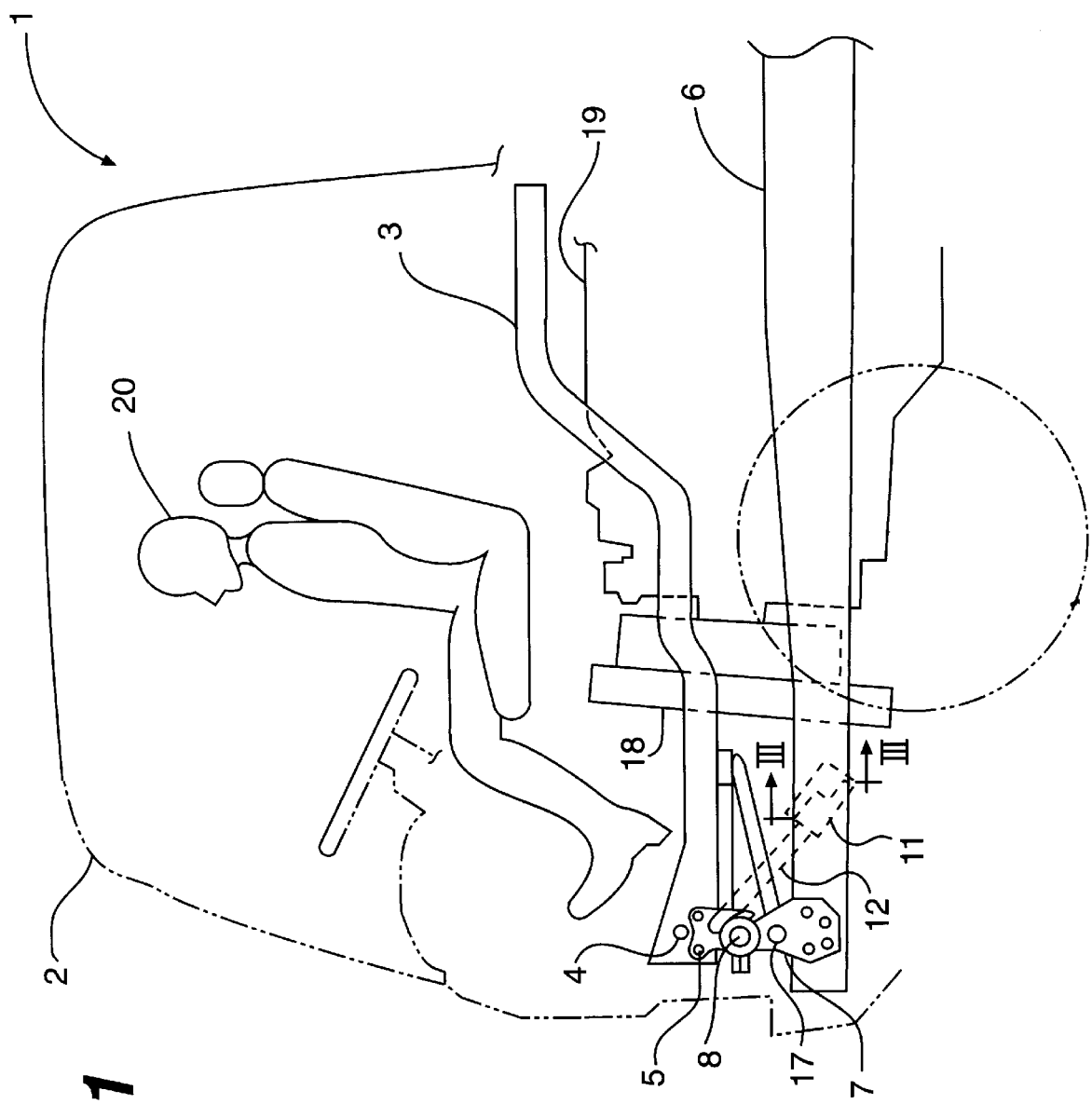
FIG. 1 is a schematic side view according to an embodiment of the present invention.

Now, hereinafter, a prefferred embodiment according to the present invention shown in the drawings will be described.

In a cab over type vehicle 1, there are provided a pair of main sills 3, on the lateral sides thereof under a cab 2, for respectively extending in the longitudinal direction of the vehicle, and both ends of a cross pipe 4, extending in the vehicle width direction, are fixed to the front ends of the main sills 3 respectively so that the cab 2 is reinforced by means of the main sills 3 and the cross pipe 4. An upper cab hinge bracket 5 is bolted to each of the main sills 3 at the tip thereof.

Also, the structure is arranged such that a lower cab hinge bracket 7 is bolted to each of the right and left tips of a chassis frame 6, and the right and left upper cab hinge brackets 5 and the right and left lower cab hinge brackets 7 are respectively connected through a cab hinge shaft 8 extending in the vehicle width direction so as to constitute a front cab hinge which includes the upper cab hinge brackets 5, the cab hinge shaft 8, and the lower cab hinge brackets 7 to enable the cab 2 to tilt upwardly forward in FIG. 1 around the cab hinge shaft 8.

Figure 2:
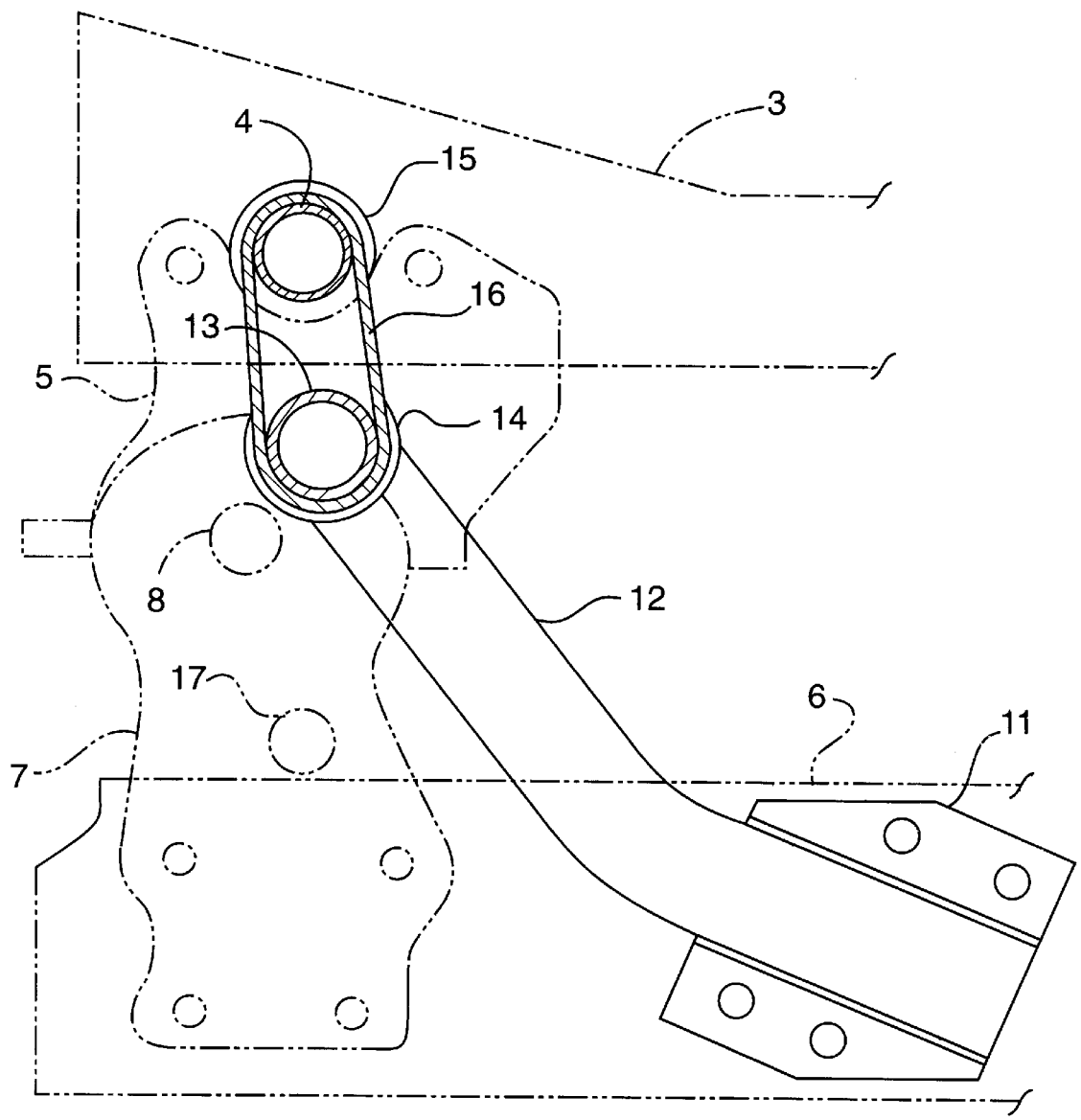
FIG. 2 is a longitudinal sectional view of the essential portions showing the above-described embodiment.
Figure 3:
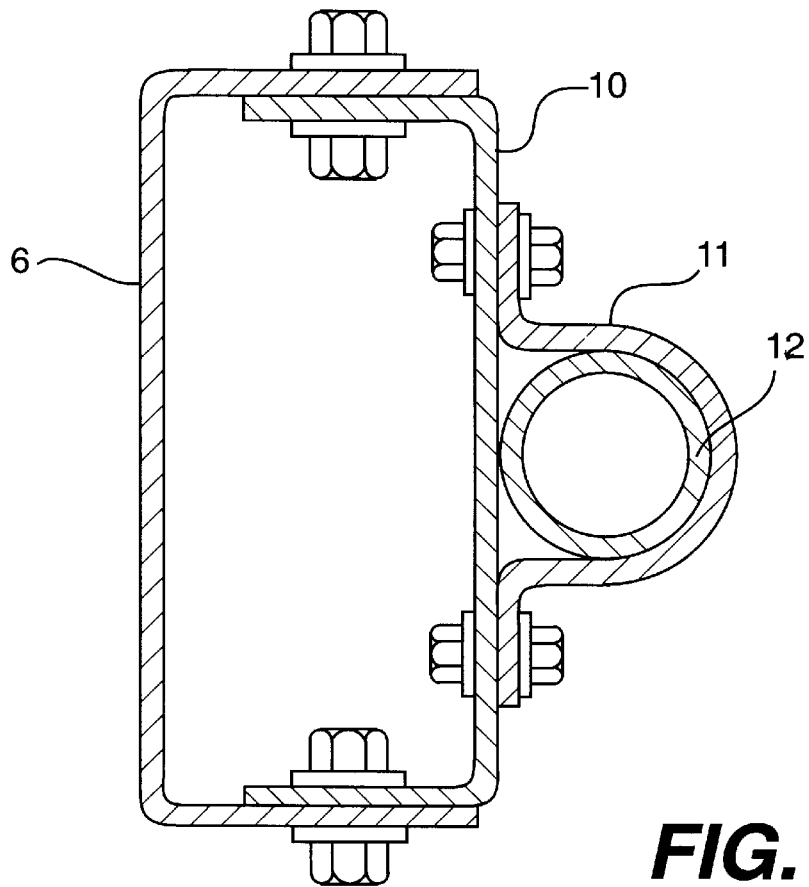
FIG. 3 is an enlarged cross-sectional view taken on line III—III of FIG. 1.
Figure 4:
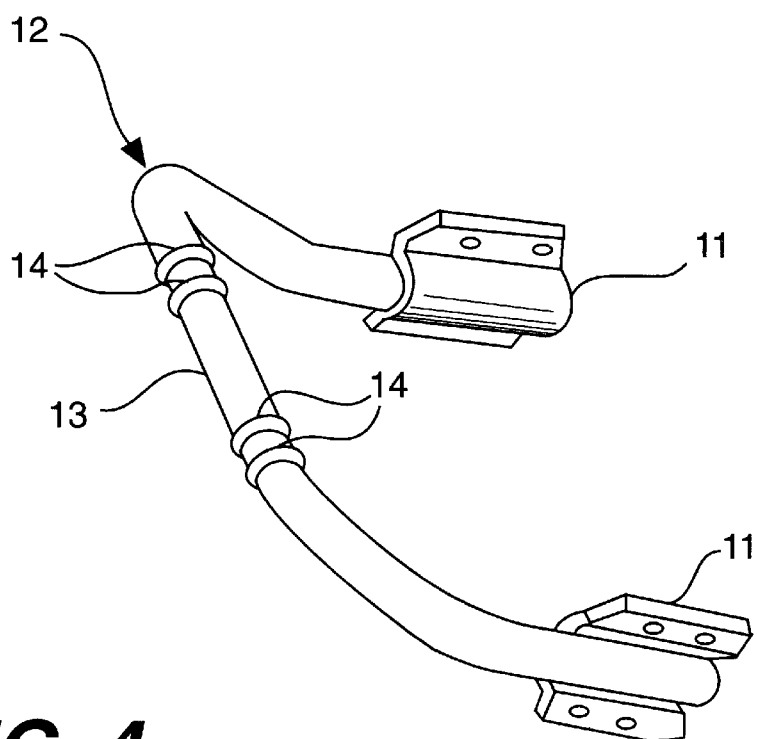
FIG. 4 is a perspective view of the essential portions showing the above-described embodiment.

On the other hand, as shown in FIGS. 3 and 4, an angle 10 shaped like substantial -form in cross section is bolted to each of the right and left sides of the chassis frame 6. Further a steel pipe 12 shaped like a substantial U-character is, at its both end portions, fixed on the inner side surface of the angle 10 in the vehicle width direction by means of a steel strapping 11 bolted on the inner side surface of each angle 10 in the vehicle width direction to be supported on the right and left sides of the chassis frame 6 so that the central portion 13 of the pipe 12 extending in the vehicle width direction rises above the chassis frame 6 as shown in FIGS. 1 and 2 and is close to the cab hinge shaft 8.

Also, as clearly shown in FIG. 4, bar stocks 14 arcuately bent are welded, at a close interval, respectively on the outer peripheral surface of the central portion 13 of the pipe on both side portions thereof, and bar stocks 15, which are arcuately bent, are also welded, at a close interval, similarly on the outer peripheral surface of the cross pipe 4 on both side portions thereof at locations opposing to those bar stocks 14 respectively. Between the outer peripheral surface of the cross pipe 4 and the outer peripheral surface of the central portion 13 of the pipe, a belt or wire 16 having a high level of flexibility is loosely spanned between the bar stocks 14 and between the bar stocks 15 respectively so that any deviation of the belt or wire 16 in the vehicle width direction on the outer peripheral surface of the cross pipe 4 and on the outer peripheral of the central portion 13 of the pipe respectively is restrained by means of the belt or wire 16 being interposed between the stock bars 14 and between the stock bars 15, respectively.

In this respect, reference numeral 17 designates a torsion bar for connecting together the right and left lower cabin hinge brackets 7; 18, a radiator; 19, an engine; and 20, a crew.

Next, the operation of the above-described device will be described.

When a great shock is exerted on the front surface of the cab 2, particularly in a backward direction at the portion above the chassis frame 6 due to a head-on collision of the vehicle 1 while it is running, the cab 2 is first supported by the chassis frames 6, which is a main strength member of the vehicle 1, through the front cabin hinge constituted by the upper cab hinge brackets 5, the cab hinge shaft 8 and the lower cab hinge brackets 7.

When, however, the front cabin hinge breaks and causes the cabin 2 to displace backward, the cab 2 is supported by the chassis frame 6 to restrain its rear displacement because the pipe 12, both ends of which are supported by the right and left sides of the chassis frame 6 and the main sills 3 of the cab 2 are connected together with the cross pipe 4 and a strong belt or wire 16. If the cap 2 is further displaced backward, the pipe 12 will bend and deform backward because the belt or wire 16 is too strong to be cut off, and therefore, the kinetic energy of the above-described shock will be absorbed by this bending deformation.

More specifically, the rear displacement of the cab 2 will be restrained, and the shock exerted on the cab 2 will be lessened by the bending deformation of the pipe 12, and as a result, the crew 20 within the cab 2 can be protected against the shock to secure his safety.

Also, since the pipe 12 is shaped like a substantial U-character, the restraint of the rear displacement of the cab 2 by the pipe 12 and the shock lessening operation to the cab 2 can be achieved in the substantially same manner as in a head-on collision even when the vehicle 1 collides obliquely.

Further, since the belt or wire 16 is spanned across the outer peripheral surface of the cross pipe 4 and the outer peripheral surface of the central portion 13 of the pipe, the transverse deviation of the belt or wire 16 in the vehicle width direction is restrained by means of the bar stocks 15 and the bar stocks 14, respectively, thereby securely exhibiting the above-described traction operation, resulting in the secured safety of the crew 20.

Also, between the outer peripheral surface of the cross pipe 4 and the outer peripheral surface of the central portion 13 of the pipe, the belt or wire 16 is loosely spanned across the bar stocks 15 and the bar stocks 14, and therefore, even if the relative distance between the cross pipe 4 and the cab hinge shaft 8 may slightly vary when the cap 2 tilts around the cab hinge shaft 8, the difference therein can be easily absorbed by looseness or tension of the belt or wire 16. Accordingly, the belt or wire 16 does not obstruct the tilting operation of the cab 2.

And yet, a mechanism between the pipe 12 and the belt or wire 16 is very simple, and it is low-priced and light-weight. Moreover, the mechanism is easily applicable to conventional vehicles without necessitating any large modification, and therefore, the device is particularly excellent in practical effect.

This device has an advantage that by appropriately changing the shape, thickness, material or the like of the pipe 12, it is possible to arbitrarily and easily select the amount of absorption and absorption characteristics of energy caused by the bending deformation of the pipe.

Further, it is also possible to perform a similar energy absorption operation, as described above, by using a solid steel stock or the like.

In this respect, with regard to the belt or wire in each of the above-described embodiments, it is needless to say that it is possible to make the length of the belt or wire comparatively longer than the distance between the cross pipe 4 and the central portion of the pipe in such a manner that it is spanned across the two like a sash (which is used for holding up tucked sleeves) to thereby cause the fluctuation in the relative distance between the cross pipe and the cab hinge shaft to be more easily absorbed.

In a safety device for cab over type vehicles according to the present invention, a cross member, both ends of which are connected together to a lateral pair of cab reinforcing members respectively, extending in the vehicle width direction, and one end of the energy absorbing member fixed to the chassis frame are connected together with a flexible member, and the cab is engaged with the chassis frame through the flexible member and the energy absorption member. Therefore, a rear displacement of the cab due to a collision of the vehicle is restrained by the chassis frame, and the shock transmitted from the cab reinforcing member to the energy absorption member through the cross member and the flexible member can be securely absorbed by the deformation of the energy absorption member to lessen the shock received by the cab. Thus, the crew of the vehicle can be protected against the collision to enhance the safety. Also, the cross member and one end of the energy absorption member are connected together with a flexible member so that the difference in the relative distance caused between the cross member and the energy absorption member when the cab tilts can be easily absorbed by the flexible member, and therefore, this device causes no obstruction in the tilting operation of the cab.

What is claimed is:

1. A safety device for a cab over type vehicle, comprising: a lateral pair of reinforcing members provided under a cab, said reinforcing members extending in the longitudinal direction of the vehicle;

a cross member, both ends of which are connected to said reinforcing members at their front end portions respectively, said cross member extending in the vehicle width direction;

an energy absorption member, a central portion of which is located in the vicinity of said cross member and at least one end of which is fixed to a chassis frame; and a flexible member connecting said cross member and said energy absorption member.

2. A safety device of claim 1, wherein both ends of said energy absorption member are fixed to the right and left sides of said chassis frame respectively, and wherein the central portion of said energy absorption member provided along the vehicle width direction rises above said chassis frame and located in the vicinity of said cross member.

3. A safety device of claim 1, wherein said flexible member is a wire or a belt.

4. A safety device of claims 1, further comprising:

a stopper for restraining deviation of said flexible member in the vehicle width direction along said cross member and/or said energy absorption member.

5. A safety device of claims 1, wherein a plurality of flexible members are arranged at intervals in the vehicle width direction.

6. A safety device of claim 2, wherein said flexible member is a wire or a belt.

7. A safety device of claim 2, further comprising:

a stopper for restraining deviation of said flexible member in the vehicle width direction along said cross member and/or said energy absorption member.

8. A safety device of claim 3, further comprising:

a stopper for restraining deviation of said flexible member in the vehicle width direction along said cross member and/or said energy absorption member.

9. A safety device of claim 2, wherein a plurality of flexible members are arranged at intervals in the vehicle width direction.

10. A safety device of claim 3, wherein a plurality of flexible members are arranged at intervals in the vehicle width direction.

11. A safety device of claim 4, wherein a plurality of flexible members are arranged at intervals in the vehicle width direction.

12. A safety device of claim 1, further comprising:

a lower cab hinge bracket attached to said chassis frame: and an upper cab hinge bracket attached to said reinforcing member and pivotally connected to said lower cab hinge such that said cab tilts around a pivotal point, wherein said flexible member absorbs changes in a distance between said cross member and said central portion of said energy absorption member when tiling said cab.

13. A safety device of claim 12, wherein a length of said flexible member is longer than a distance between said cross member and said central portion of said energy absorption member.

* * * * *